(12) United States Patent
Matsumoto et al.

(10) Patent No.: US 8,917,800 B2
(45) Date of Patent: Dec. 23, 2014

(54) DC BALANCE OFFSET ADJUSTABLE CIRCUIT AND SEMICONDUCTOR DEVICE INCLUDING THE SAME

(71) Applicant: Hitachi, Ltd., Chiyoda-ku, Tokyo (JP)

(72) Inventors: Akira Matsumoto, Tokyo (JP); Naoki Mori, Tokyo (JP); Takashi Yagi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/964,069

(22) Filed: Aug. 10, 2013

(65) Prior Publication Data

US 2014/0072079 A1   Mar. 13, 2014

(30) Foreign Application Priority Data

Sep. 7, 2012   (JP) ................................. 2012-196767

(51) Int. Cl.
*H04L 25/06* (2006.01)
*H04B 1/12* (2006.01)

(52) U.S. Cl.
CPC ..................................... *H04B 1/123* (2013.01)
USPC ........... 375/317; 375/319; 375/316; 375/231; 375/326; 375/360; 375/136; 375/260; 327/307; 327/211; 327/212; 327/224; 341/100; 341/56; 341/58

(58) Field of Classification Search
USPC .............. 327/211, 212, 224; 341/100, 56, 58; 375/319, 317, 316, 231, 326, 360, 136, 375/260
See application file for complete search history.

(56) References Cited

U.S. PATENT DOCUMENTS 7,812,749 B2 * 10/2010 Abel et al. .................... 341/118

FOREIGN PATENT DOCUMENTS

JP          10-341261 A      12/1998

* cited by examiner

*Primary Examiner* — Rahel Guarino
(74) *Attorney, Agent, or Firm* — Miles & Stockbridge P.C.

(57) ABSTRACT

A mechanism is provided for dynamically adjusting DC offset at the time of deviation from DC balance ½ (DC level) in a data pattern including long-period consecutive bits generating DC offset in a section of data. A receiver circuit unit of an LSI having a serializer/deserializer arrangement for performing high-speed serial transmission includes an offset adjusting circuit. The offset adjusting circuit calculates DC balance in an arbitrary section of data by averaging received serial data. Based on comparison between a DC level and the DC balance obtained by averaging the received data, offset is shifted toward the H side when the DC balance exists on the H side from the DC level, and shifted toward the L side when the DC balance exists on the L side.

2 Claims, 9 Drawing Sheets

DC BALANCE OFFSET ADJUSTABLE CIRCUIT AND SEMICONDUCTOR DEVICE INCLUDING THE SAME

BACKGROUND OF THE INVENTION

1. Field of the Invention

The present invention relates to a DC balance offset adjustable circuit and a semiconductor device including this DC balance offset adjusting circuit. The invention more particularly relates to an effective technology for improvement of bit error rate (BER) by dynamically controlling DC offset of a receiver circuit included in a semiconductor device used for high-speed transmission, wherein the DC offset of the receiver can be adjusted in accordance with DC offset in an arbitrary section of received data.

2. Background Art

For high-speed serial transmission between devices (LSI-LSI), the 8 B10 B encode system has been generally used because of the advantages of this system, such as stability behavior (consecutive 5 bits or shorter) of a clock data recovery (CDR) circuit and reduction of data dependent jitter. However, the use of encode systems such as 64 B/66 B, 64 B/67 B, and 128 B/130 B having an increased unit data length is currently prevailing with recent increases of the transmission rate.

The use of an encode system having a longer unit data length can raise the effective transmission rate higher than that of 8 B10 B system, resulting in a 20% difference in the transmission rate. In this case, however, the DC balance of H/L compensated ½ (DC level) for 8 B10 B collapses in a certain section of received data, and generates DC offset.

Generally, DC balance is kept at ½ (DC level) in a pseudo random pattern (PRBS). According to a long data pattern such as PRBS23 and PRBS31, DC offset becomes significant and deteriorates BER in a section of data around a range from 100 to 1,000 bits.

For adjustment of DC offset, there are two systems currently employed: one performs automatic adjustment by calibration at the time of power on of an LSI; and the other performs automatic and dynamic adjustment for data patterns.

The invention has been developed to provide dynamic DC offset adjustment for data patterns. A typical example of related art associated with this adjustment is shown in JP-A-10-341261.

This reference discloses a method which removes offset from a reference level based on the phase difference between a received data pattern and a clock recovered from the data pattern.

According to the technology disclosed in JP-A-10-341261, the DC offset of a receiver can be dynamically adjusted relative to a DC offset value corresponding to the phase difference of the received data, but it is difficult to adjust relative to DC balance in an arbitrary section of the received data.

Generally, a worst case bit pattern of received data in a high-speed transmission system is dependent on characteristics of a transmission channel (loss, reflection, and distance) and performance of a receiver circuit (receiver, equalizer, and CDR) and the like. Thus, according to some high-speed transmission specifications, a tolerance test for each data pattern is evaluated based on a reference transmission loss determined beforehand.

In a system allowing transmission at $BER<1\times E^{-12}$ between LSI-LSI, errors have been observed in an arbitrary section of data. These errors are considered to have been produced by biasing of DC offset.

This system meets the specifications for the receiver jitter tolerance. However, examination of the error locations in the data pattern shows that the data pattern has no worst pattern (such as solitary waves) of PRBS, but contains errors generated with repeatability in a section integrating each data pattern of around 100 to 1,000 bits and generating biasing of DC offset.

SUMMARY OF THE INVENTION

An object of the invention is to provide a technology which achieves dynamic DC offset adjustment for data patterns during high-speed data transmission between devices (LSI-LSI) unlike DC offset adjustment during training sequences generally performed at the time of power on of an LSI.

Another object of the invention is to provide a mechanism which dynamically adjusts DC offset in data patterns (such as PRBS23 and PRBS31) including long-period consecutive bits generating DC offset in the above-mentioned section of data at the time of deviation from DC balance of ½ (DC level).

The outline of a typical system according to the invention is now briefly explained.

Generally, DC offset adjustment is performed for correcting circuit variations at the time of power-on of an LSI.

However, when long-period consecutive bits are transmitted in an encode system whose DC balance at ½ (DC level) per one word is not compensated, DC balance of H/L starts to bias toward H side or L side.

In this data transmission condition, a difference is produced between the result of the DC offset adjustment (DC level) executed at the time of power-on and the DC level of the received data in an arbitrary section. This difference becomes DC offset.

Considering these points, the received data is averaged in an arbitrary section of data, and the offset sensitivity of the receiver circuit is adjusted according to a DC offset value based on the DC level of the data.

In conventional communication standards for high-speed transmission, an EYE opening at the receiver end of an LSI is specified. In recent years, however, the EYE at the receiver end is completely closed with increasing transmission rate, in which condition H/L determination is difficult. In this case, attenuation of signals in a transmission channel is restored by an equalizer of the receiver circuit at the time of acquisition of data.

Moreover, DC level of data is not always compensated by the diversification of encode systems resulting from the increase in the transmission speed as discussed above.

Accordingly, the invention provides a technology which extracts a DC offset value from the result of averaging of received data, and dynamically controls offset of the receiver circuit for improvement of BER even in the above transmission condition.

DESCRIPTION OF THE PREFERRED EMBODIMENT

An embodiment according to the invention is hereinafter described with reference to the drawings.

Figure 1:
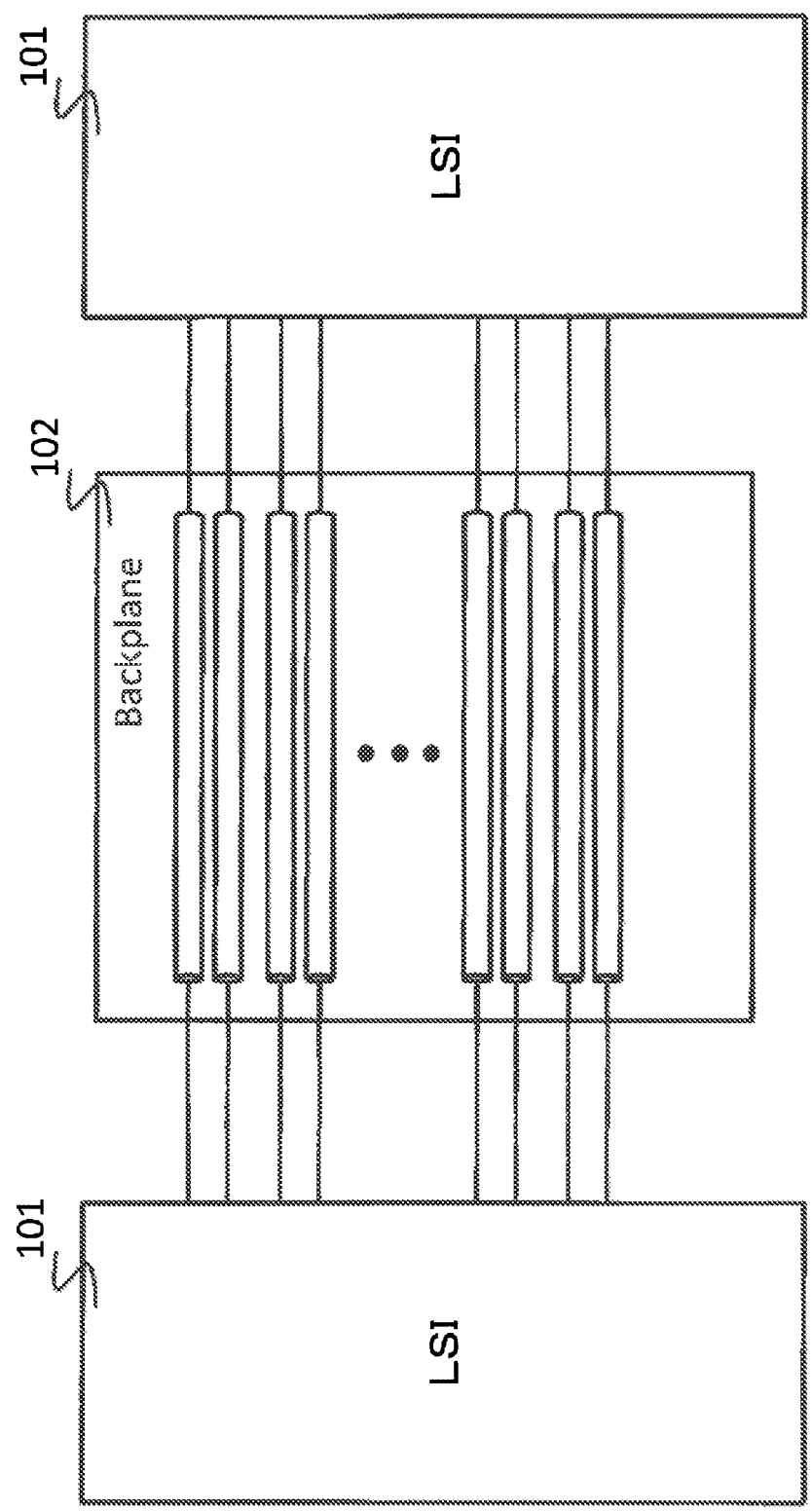
FIG. 1 is a block diagram showing a high-speed serial data transmission system including backplane between semiconductor devices (LSI-LSI) according to an embodiment of the invention.

FIG. 1 illustrates a structure of a transmission system for high-speed serial data between semiconductor devices (LSI-LSI) according to this embodiment. In a conventional high-speed transmission, margins at the time of transmission are compensated for by using 8 B10 B encode system. However, with further increase in the transmission rate, encode systems such as 64 B66 B and 128 B130 B have been introduced as new high-speed transmission encode systems capable of reducing overhead produced by encoding. For example, in the case of PCI Express Gen3 providing high-speed serial data transmission equivalent to PRBS23 by adopting 128 B130 B encode system, dynamic adjustment of the receiver sensitivity (DC offset) for controlling DC offset generated in a particular period is effective for improvement of transmission margins.

Figure 2:
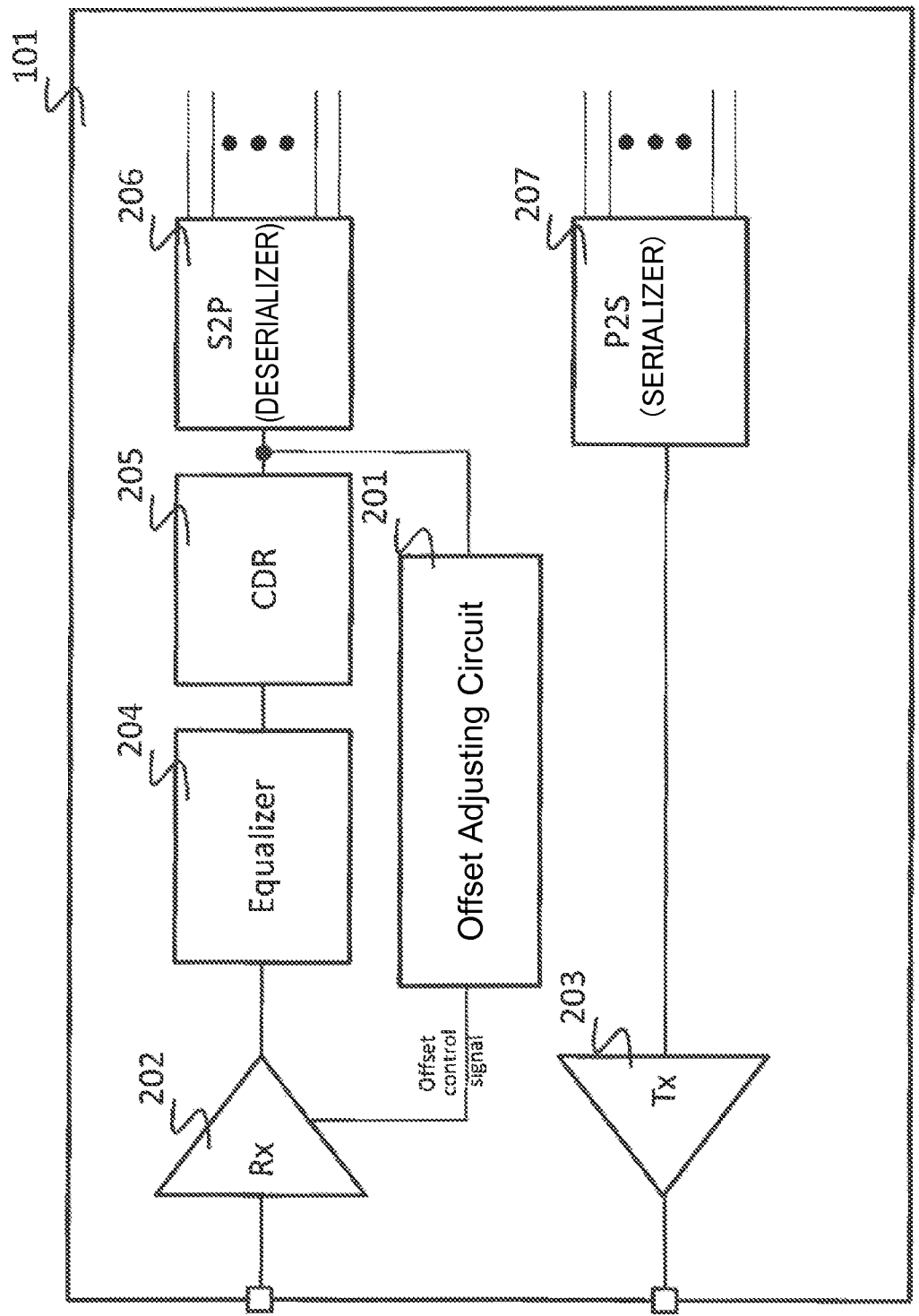
FIG. 2 is a block diagram showing a high-speed transmitter and receiver circuit of a semiconductor device according to the embodiment of the invention.

FIG. 2 is a block diagram showing a high-speed transmitter and receiver (SERDES: serializer/deserializer) circuit of the semiconductor device. According to an embodiment of the invention, an offset adjusting circuit 201 is provided to detect a DC offset value in an arbitrary section of received data and to feed back an offset correction amount to a receiver (Rx) 202. As illustrated in FIG. 2, the offset adjusting circuit 201 is added to a receiver circuit unit of a conventional high-speed transmitter and receiver (SERDES) circuit which includes the receiver (Rx) 202 receiving high-speed serial data, a driver (Tx) 203 transmitting high-speed serial data, an equalizer 204 compensating for attenuation of received data, a clock data recovery (CDR) circuit 205 restoring a clock from received data in the serial form, a deserializer (serial to parallel converting circuit (S2P, serial to parallel)) 206 converting serial data into parallel data by recovered clock, and a serializer (parallel to serial converting circuit (P2S, parallel to serial)) 207 converting logically processed parallel data to serial data.

The offset adjusting circuit 201 in this embodiment is provided for the purpose of dynamic adjustment of an offset level of the receiver (Rx) 202 with respect to DC offset in an arbitrary section of received data. The offset adjusting circuit 201 performs calculation for data obtained after waveform correction by the equalizer 204 so as to calculate DC balance of the received data.

According to this embodiment, calculation is executed for the output data from the clock data recovery (CDR) circuit 205. However, the target for the calculation is not limited to this data. The use of data before or after the clock data recovery (CDR) circuit 205, or output parallel data from the deserializer (serial to parallel converting circuit (S2P, serial to parallel)) 206 is also effective as long as calculation of DC balance of the received data and feedback of the optimum offset are allowed.

Figure 3:
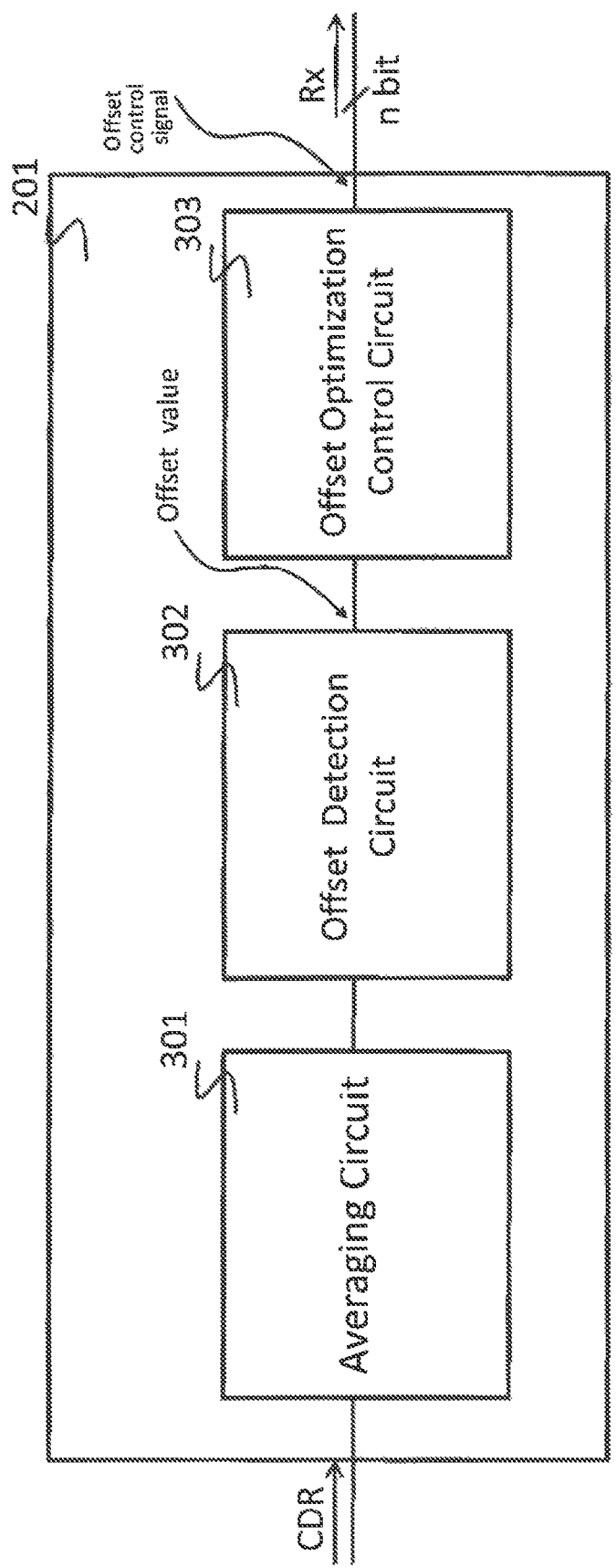
FIG. 3 is a block diagram showing an offset adjusting circuit of the receiver circuit according to the embodiment of the invention.

FIG. 3 is a block diagram showing the structure of the offset adjusting circuit 201.

The offset adjusting circuit 201 includes an averaging circuit 301 which averages output data from the clock data recovery (CDR) circuit 205 in an arbitrary section, an offset detection circuit 302 which detects a DC offset value by comparing a DC balance in the arbitrary averaged section and a reference voltage (DC level), and an offset optimization control circuit 303 which feeds back a correction value of DC offset to the receiver (Rx) 202 based on the detected DC offset value and at least one threshold.

Figure 4:
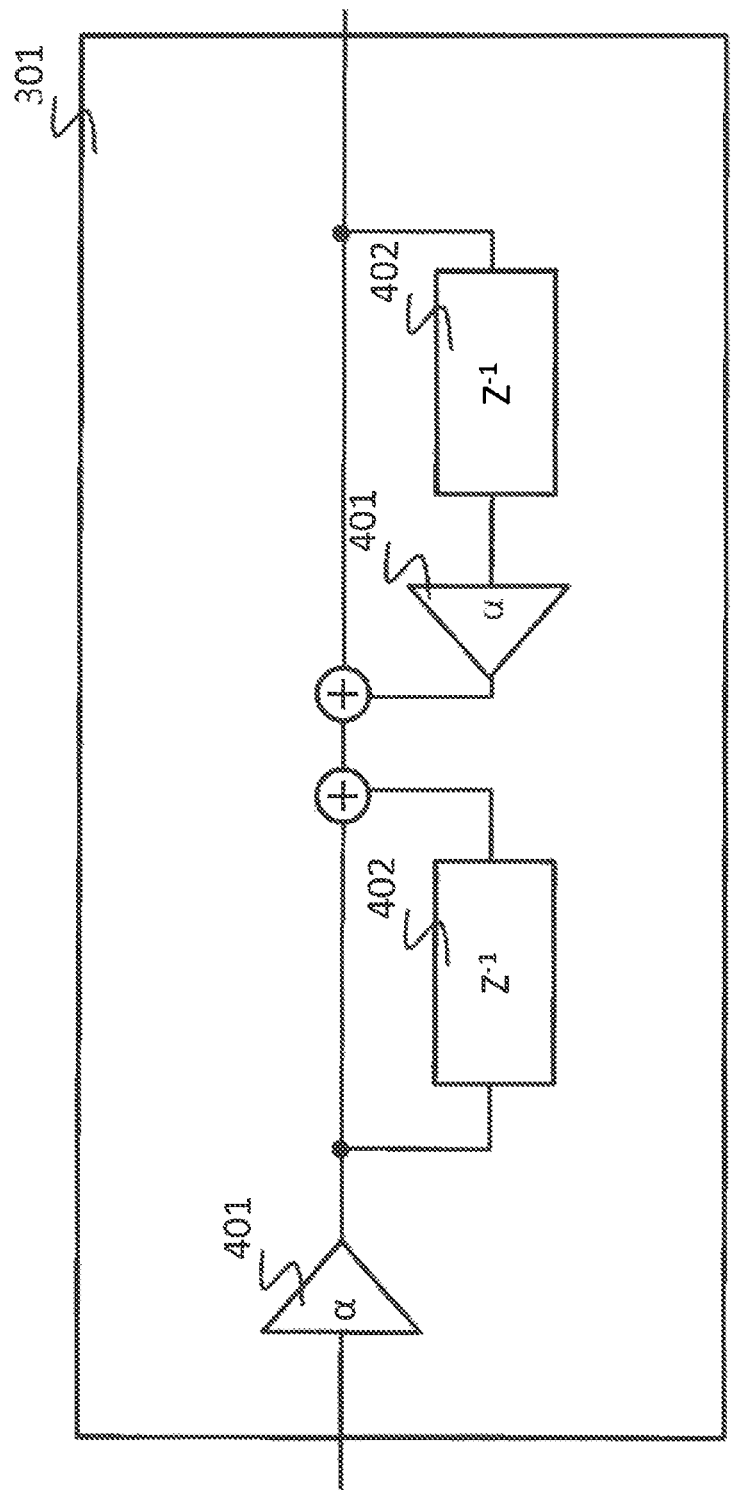
FIG. 4 is a block diagram showing an averaging circuit of the offset adjusting circuit according to the embodiment of the invention.

FIG. 4 is a block diagram showing the averaging circuit 301 included in the offset adjusting circuit 201 and performing calculation for serial data outputted from the clock data recovery (CDR) circuit 205.

According to this embodiment, the averaging circuit 301 is constituted by an infinite impulse response (IIR) digital low pass filter (LPF). The averaging circuit 301 in this embodiment can freely determine and output the degree of averaging by arbitrarily selecting the tap coefficient ($\alpha$) of a multiplying circuit 401 with infinite time (infinite length) set for the DC balance of the serial data. The one or plural tap coefficients thus equipped can vary the band of the infinite impulse response (IIR) digital low pass filter (LPF) and realize an arbitrary calculation time.

The serial data is inputted to the offset detection circuit 302 which calculates a DC offset value based on the DC balance of the received data averaged by the averaging circuit 301 for an arbitrary time, and the DC level. The offset detection circuit 302 has at least one threshold around the DC level to detect the DC offset value. A delay element is designated by a reference number 402 in the figure.

Figure 5:
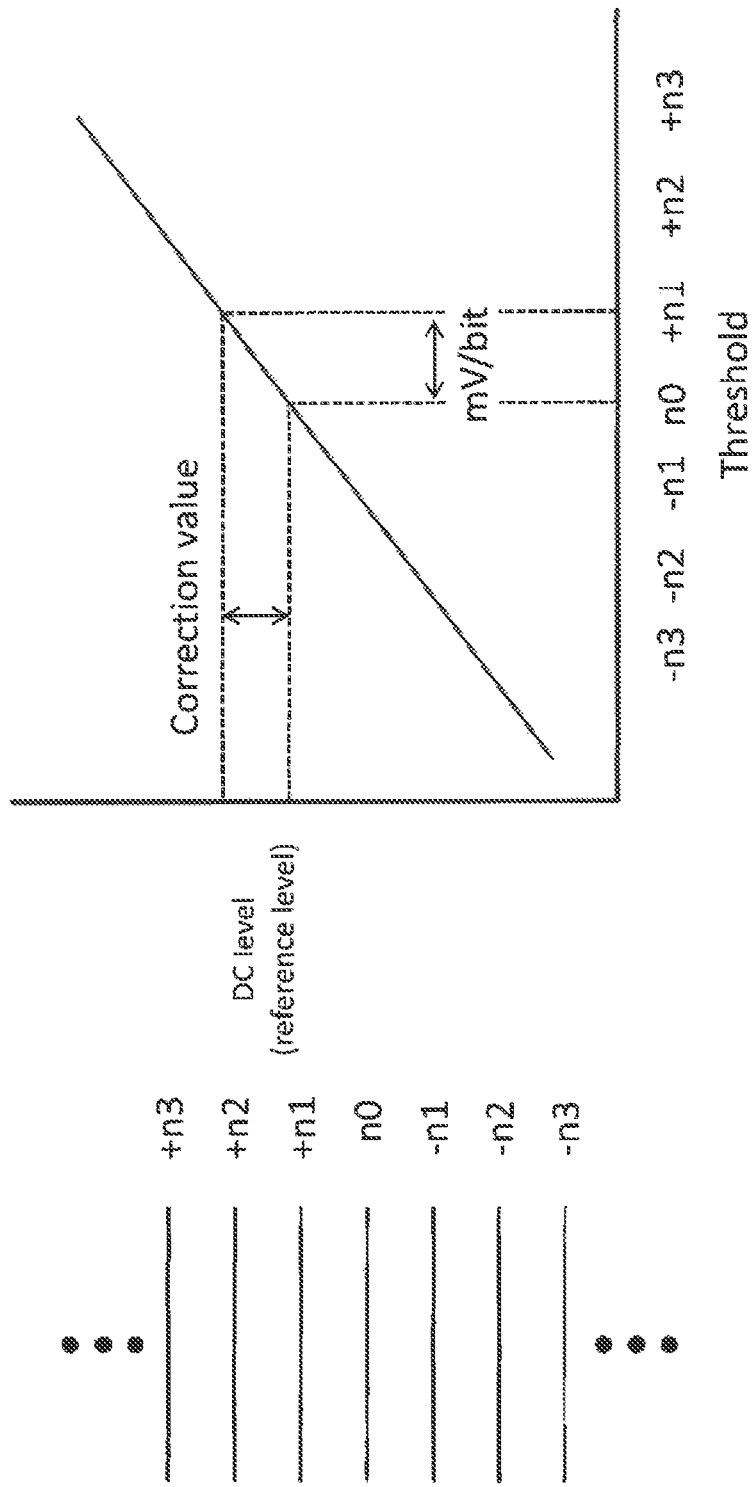
FIG. 5 illustrates an operation concept of DC offset value detection according to the embodiment of the invention.

FIG. 5 shows an operation for DC offset value detection in this embodiment. Assuming that the DC level produced from the reference voltage is set at n0, thresholds for offsets higher than the DC level are represented by +n1, +n2, +n3, and larger, and thresholds for offsets lower than the DC level by −n1, −n2, −n3, and lower.

For example, when the offset value obtained by averaging for an arbitrary time corresponds to +n1, the offset of the receiver (Rx) 202 is shifted by one level from the DC level to the H side. When the offset value obtained by averaging for an arbitrary time corresponds to −n1, the offset of the receiver (Rx) 202 is shifted by one level from the DC level to the L side. By this method, the offset value optimized for the DC balance can be fed back.

According to this embodiment, the averaging circuit 301 is constituted by the infinite impulse response (IIR) digital low pass filter (LPF). However, the structure of the averaging circuit may be changed in accordance with applications without departing from the scope of the invention. For example, the averaging circuit may be constituted by a counter instead of the infinite impulse response (IIR) digital low pass filter (LPF).

Figure 6:
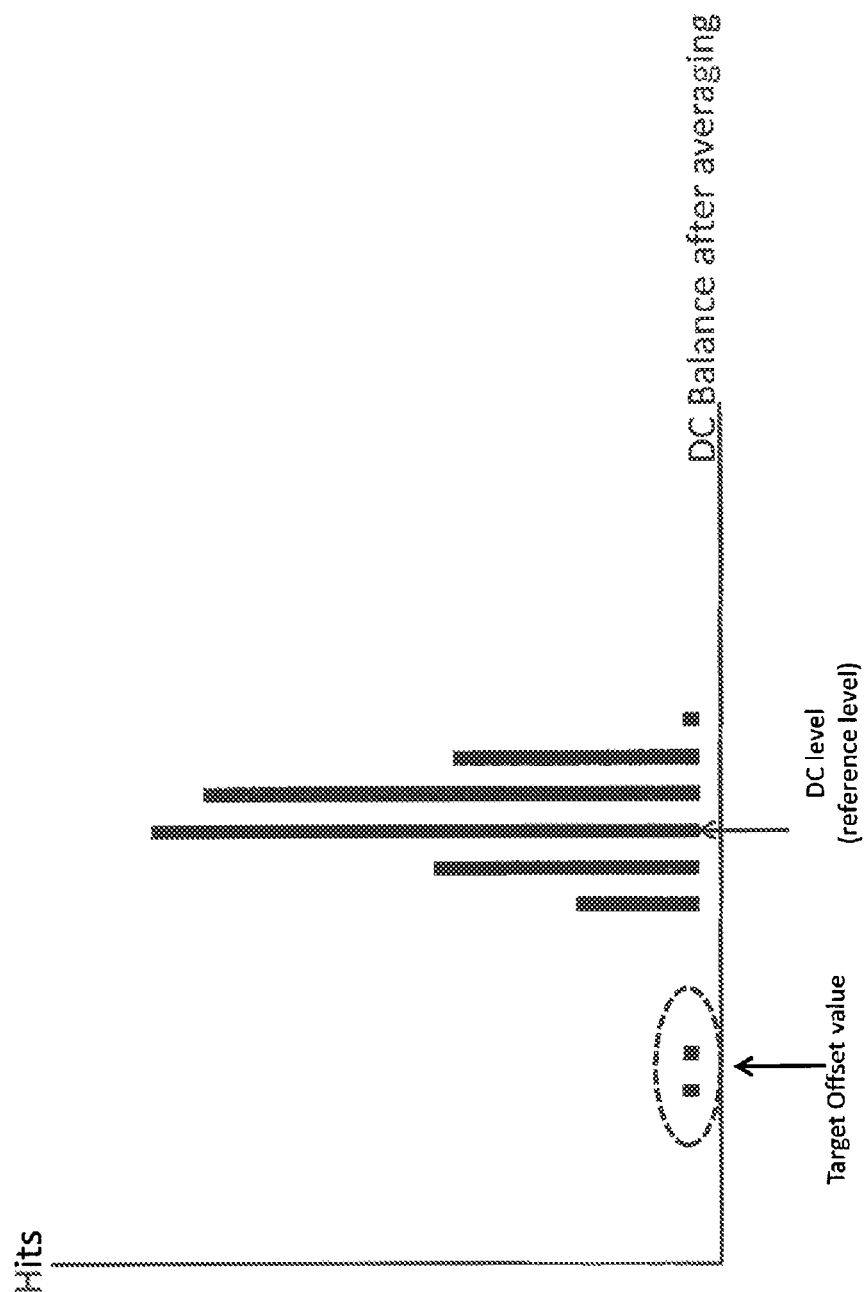
FIG. 6 illustrates a concept of DC offset after averaging serial data according to the embodiment of the invention.

FIG. 6 illustrates the outline of averaging for received data in an arbitrary section. As noted above, a data pattern containing long-period bits such as PRBS23 and PRBS31 includes a large number of H or L consecutive bits in a particular section in some cases. Thus, when averaged in an arbitrary section, this type of data pattern produces a section considerably biasing from the vicinity of the DC level. Accordingly, the DC offset of the receiver (Rx) 202 is adjusted for the section greatly biasing in the histogram so as to improve transmission performance as illustrated in FIG. 6.

This embodiment targets only the DC balance around 100 to 1,000 bits, and does not follow data transition within a short period generally targeted by 8B10B. Thus, compensation for the DC offset in accordance with the DC balance of the received data does not significantly change the characteristics of the receiver circuits of the main path such as the equalizer 204.

Figure 7:
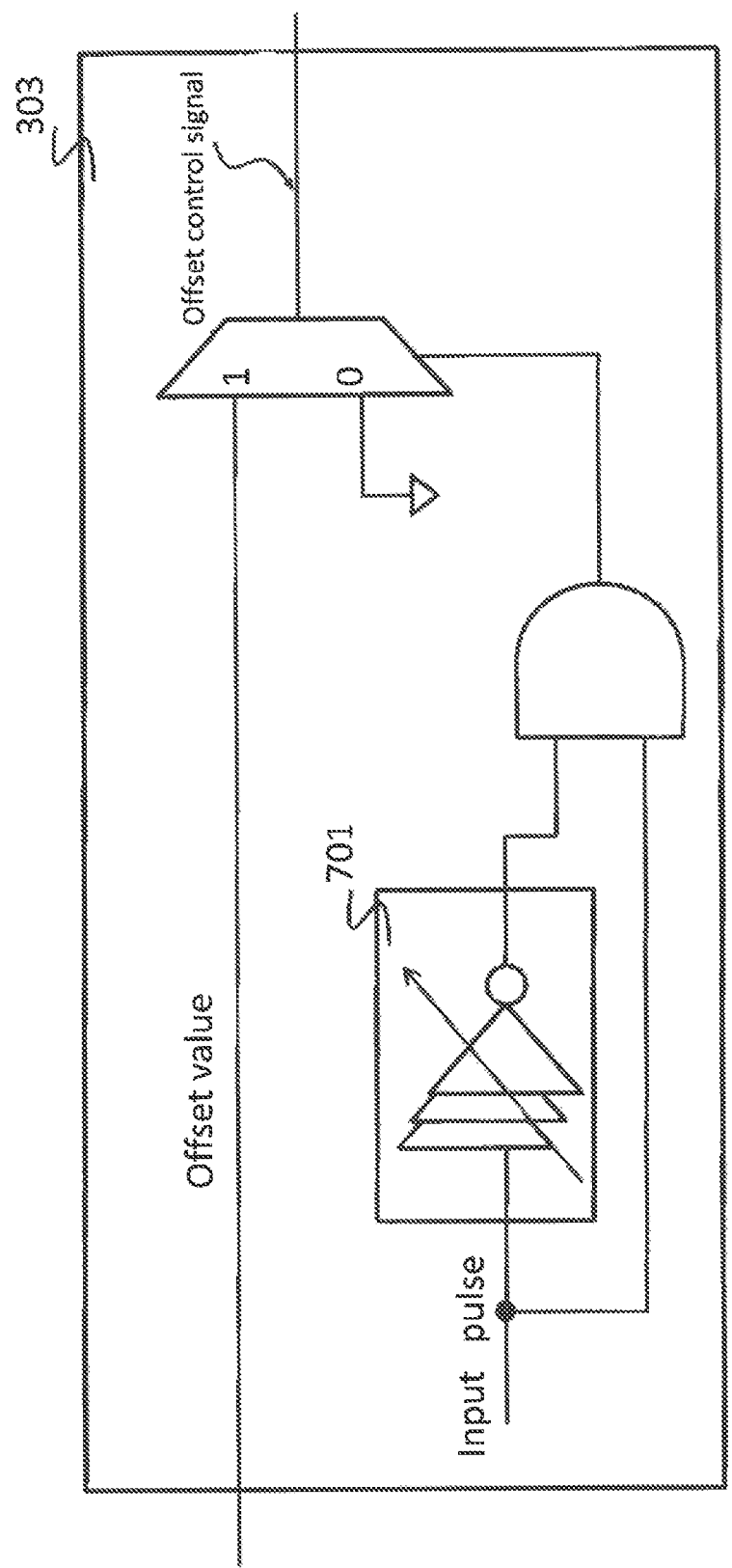
FIG. 7 is a block diagram showing an offset optimization control circuit according to the embodiment of the invention.

FIG. 7 is a block diagram showing the offset optimization control circuit 303. The offset optimization control circuit 303 controls the feedback amount so as to avoid excessive response (excessive control) of the DC offset of the receiver (Rx) 202 to an offset threshold mV/bit arbitrarily determined from the DC level.

The offset optimization control circuit 303 is now briefly explained. The offset optimization control circuit 303 adjusts the output pulse width by adding arbitrary delays to input pulses using a variable delayer 701 to use the adjusted output pulse width for fine adjustment of offset adjustment time. The input pulses are selected from pulses optimized for the corresponding application such as reference clocks and logical clocks.

When the one or plural averaging circuits 301 having different averaging sensitivity are used, such a system is also effective which estimates changes of DC balance beforehand and dynamically controls the level number of the variable delayer 701 based on the calculation result.

An output signal from the offset optimization control circuit 303 dynamically controls the offset value of the receiver (Rx) 202 based on the calculation result of the DC balance of the serial data.

According to this embodiment, the adjusting method for the DC offset value of the receiver (Rx) 202 performs fine control of the load resistance and the current source of CML (current mode logic) by using n-bit signals inputted from the offset optimization control circuit 303.

Figure 8:
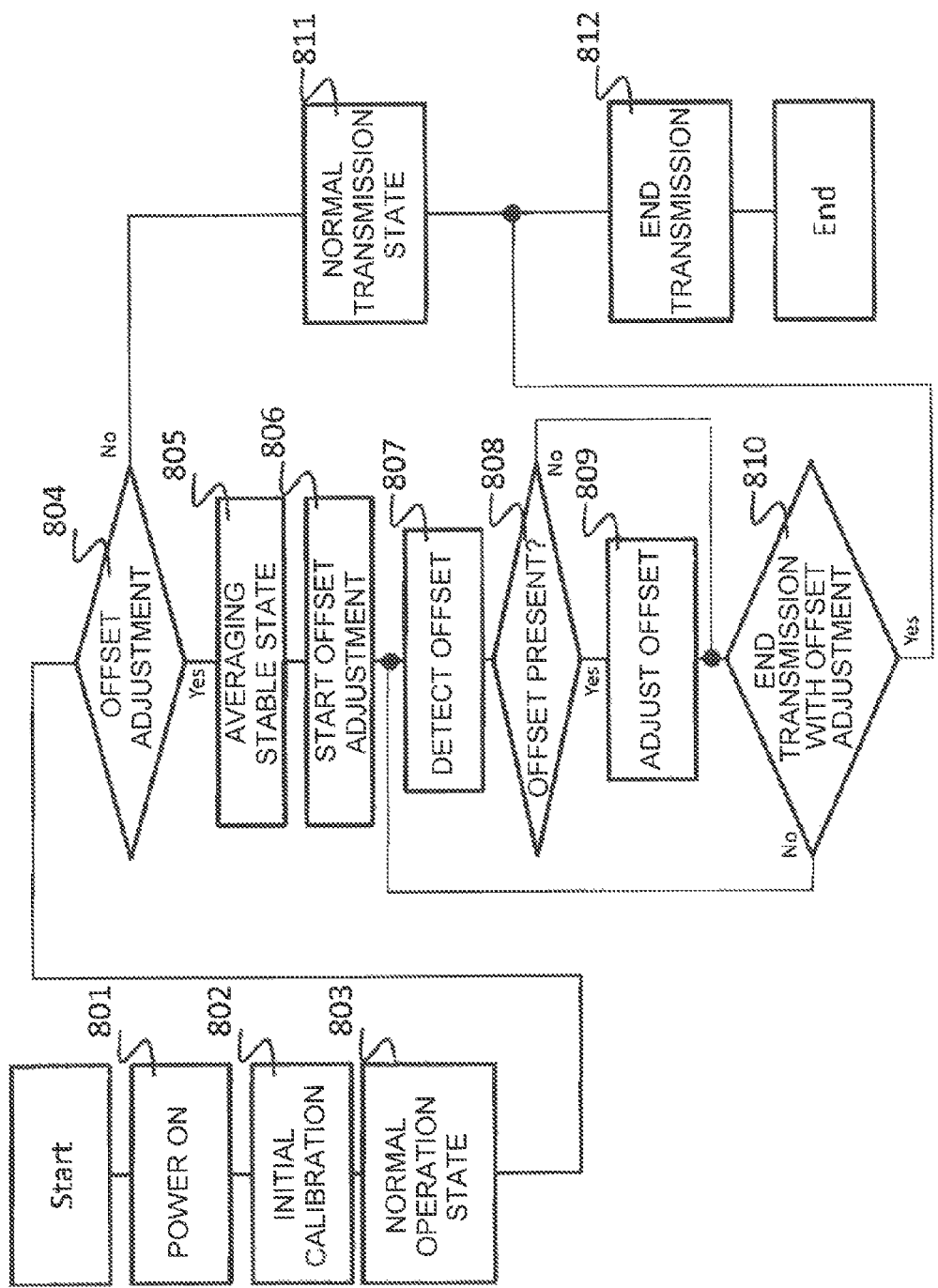
FIG. 8 is a flowchart showing offset adjustment according to the embodiment of the invention.

FIG. 8 is a flowchart showing sequences of offset adjustment for the receiver in accordance with the DC balance of the received data.

After power of the semiconductor device (LSI) is turned on in 801, calibration is executed for each circuit block in 802. Generally, the DC offset of the receiver (Rx) 202 is also calibrated in this step. This calibration is an ordinary correction for circuit variations, and is different from the dynamic DC offset adjustment of the present application. This adjustment is therefore not explained in detail.

The semiconductor device (LSI) comes into the normal operational state in 803, and initiates data transmission and reception between the semiconductor devices (LSI-LSI).

When it is determined that the offset adjustment for the receiver is executed in accordance with the DC balance of the received data in 804, the offset value is calculated in accordance with the averaging time of the averaging circuit 301 and the pulse width of the offset optimization control circuit 303.

In 805, the adjustment of the DC offset does not start until the output level of the IIR digital LPF exceeds the DC level after input of the serial data.

After asserting a flag showing stabilization of averaging in 805, the adjustment of the DC offset is initiated in 806.

Comparison is made between the DC balance obtained after averaging of the received data and the DC level by the offset detection circuit 302 in 807 to detect the DC offset.

When the DC offset exceeds an arbitrary threshold in 808, the DC offset of the receiver (Rx) 202 is corrected to an optimum value in 809 so as to improve the BER (bit error rate).

When transmission continues under execution of the DC offset adjustment in 810, the steps of the dynamic DC offset adjustment in 807 through 810 are repeated.

A state in 811 corresponds to an ordinary transmission state which does not perform the dynamic DC offset adjustment proposed in the present application.

A state in 812 shows end of all transmissions.

Figure 9:
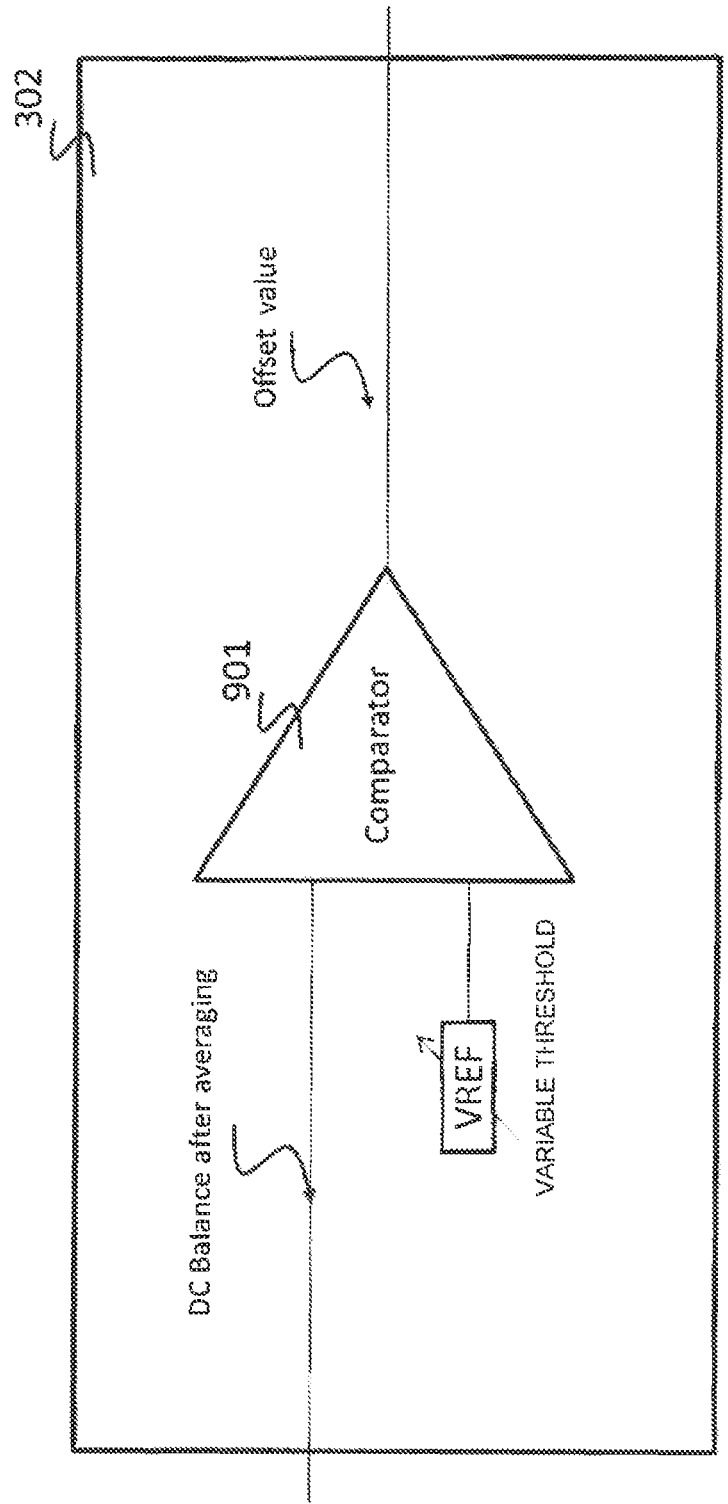
FIG. 9 illustrates a typical structure of an offset detection circuit.

FIG. 9 illustrates a typical configuration of the offset detection circuit 302. The offset detection circuit 302 compares a variable threshold (corresponding to VREF in FIG. 9) which can select at least one threshold around the DC level with the level of the DC balance after averaging received from the averaging circuit 301 by using a comparator so as to detect offset from the DC level. As discussed above, the offset value can be calculated by comparing the level with plural thresholds as illustrated in FIG. 5.

While a particular embodiment of the invention has been described herein, it is intended that the invention is not limited to this embodiment but may be practiced otherwise without departing from the scope of the invention.

What is claimed is:

1. A semiconductor device, comprising:
a receiver circuit which includes
a receiver receiving high-speed serial data,
a clock data recovery circuit restoring a clock from received serial data,
a deserializer performing serial to parallel conversion of the received data, and
an offset optimization control circuit detecting offset relative to DC balance in an arbitrary section of the received data, and adjusting DC offset of the receiver,
wherein
the offset optimization control circuit includes an averaging circuit averaging the received data in the arbitrary section, and an offset detection circuit detecting DC offset between a DC balance of the received data obtained by the averaging circuit and a DC level,
the offset optimization control circuit adjusts DC offset of the receiver in accordance with the detected DC offset, and
the offset optimization control circuit shifts offset by one level toward the H side when the offset exceeds one + side threshold from the DC level, and shifts offset by one level toward the L side when the offset exceeds one − side threshold from the DC level, based on the offset value received from the offset detection circuit.

2. The semiconductor device according to claim 1, wherein the offset detection circuit determines at least one arbitrary threshold for detecting a DC offset value, and compares high/low DC balance of the received data in the arbitrary section with the DC level to detect DC offset.

* * * * *